(12) United States Patent
Miller et al.

(10) Patent No.: US 6,553,152 B1
(45) Date of Patent: *Apr. 22, 2003

(54) METHOD AND APPARATUS FOR IMAGE REGISTRATION

(75) Inventors: Michael I. Miller, St. Louis, MO (US); Gary E. Christensen, St. Louis, MO (US); Sarang C. Joshi, St. Louis, MO (US); Ulf Grenander, Providence, RI (US)

(73) Assignee: Surgical Navigation Technologies, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/299,567

(22) Filed: Apr. 27, 1999

Related U.S. Application Data

(63) Continuation of application No. 08/678,628, filed on Jul. 10, 1996, now Pat. No. 6,009,212.

(51) Int. Cl.[7] .................................................. G06K 9/32
(52) U.S. Cl. ........................................ 382/294; 382/291
(58) Field of Search ................................ 382/131, 151, 382/141, 128, 294, 287, 296, 216, 278, 298, 224, 291, 219, 220, 226, 227, 229, 230, 231, 293, 295

(56) References Cited

U.S. PATENT DOCUMENTS

| | | | |
|---|---|---|---|
| 4,590,607 A | 5/1986 | Kauth | |
| 4,722,056 A | 1/1988 | Roberts et al. | |
| 5,204,944 A | 4/1993 | Wolberg et al. | |
| 5,323,472 A | * 6/1994 | Falk | ............ 382/141 |
| 5,351,310 A | 9/1994 | Califano et al. | |
| 5,368,030 A | 11/1994 | Zinreich et al. | |
| 5,399,146 A | 3/1995 | Nowacki et al. | |
| 5,402,801 A | 4/1995 | Taylor | |
| 5,465,308 A | 11/1995 | Hutcheson et al. | |
| 5,483,961 A | 1/1996 | Kelly et al. | |
| 5,568,809 A | 10/1996 | Ben-haim | |
| 5,572,999 A | 11/1996 | Funda et al. | |
| 5,588,430 A | 12/1996 | Bova et al. | |
| 5,630,431 A | 5/1997 | Taylor | |
| 5,675,720 A | 10/1997 | Sato et al. | |
| 5,676,673 A | 10/1997 | Ferre et al. | |
| 5,695,500 A | 12/1997 | Taylor et al. | |
| 5,695,501 A | 12/1997 | Carol et al. | |
| 5,711,299 A | 1/1998 | Manwaring et al. | |
| 5,740,274 A | 4/1998 | Ono et al. | |
| 5,747,362 A | 5/1998 | Funda et al. | |
| 5,747,767 A | 5/1998 | Raab | |

(List continued on next page.)

FOREIGN PATENT DOCUMENTS

WO      WO9801818 A      1/1998

OTHER PUBLICATIONS

Davitokas, C.A. et al., "Image Registration Based on Boundary Mapping", Johns Hopkins University, Mar. 1995.
International Search Report, PCT/US98/23619, Apr. 12, 1999.

(List continued on next page.)

*Primary Examiner*—Jayanti K. Patel
*Assistant Examiner*—Seyed Azarian
(74) *Attorney, Agent, or Firm*—Senniger, Powers, Leavitt & Roedel

(57) ABSTRACT

An apparatus and method for image registration involves computing a first transform based on landmark manifolds, using a distance measure, computing a second transform from the distance measure and the first transform. Registering the images is accomplished by applying the second transform.

15 Claims, 8 Drawing Sheets

U.S. PATENT DOCUMENTS

| | | | |
|---|---|---|---|
| 5,755,725 A | * 5/1998 | Druais | 606/130 |
| 5,772,594 A | 6/1998 | Barrick | |
| 5,795,294 A | 8/1998 | Luber et al. | |
| 5,799,055 A | 8/1998 | Peshkin et al. | |
| 5,800,535 A | 9/1998 | Howard, III | |
| 5,823,958 A | 10/1998 | Truppe | |
| 5,833,608 A | 11/1998 | Acker | |
| 5,834,759 A | 11/1998 | Glossop | |
| 5,836,954 A | 11/1998 | Heilbrun et al. | |
| 5,848,967 A | 12/1998 | Cosman | |
| 5,851,183 A | 12/1998 | Bucholz | |
| 5,868,675 A | 2/1999 | Henrion et al. | |
| 5,871,018 A | 2/1999 | Delp et al. | |
| 5,871,445 A | 2/1999 | Bucholz | |
| 5,871,487 A | 2/1999 | Warner et al. | |
| 5,891,157 A | 4/1999 | Day et al. | |
| 5,904,691 A | 5/1999 | Barnett et al. | |
| 5,920,395 A | 7/1999 | Schulz | |
| 5,921,992 A | 7/1999 | Costales et al. | |
| 5,970,182 A | * 10/1999 | Goris | 382/278 |
| 5,999,840 A | * 12/1999 | Grimson et al. | 600/424 |
| 6,112,112 A | 8/2000 | Gilhuijs et al. | |
| 6,175,655 B1 | 1/2001 | George, III et al. | |
| 6,185,320 B1 | 2/2001 | Bick et al. | |
| 6,278,457 B1 | 8/2001 | Bernardini et al. | |
| 6,300,958 B1 | 10/2001 | Mallet | |
| 6,366,800 B1 | 4/2002 | Vining et al. | |
| 6,393,159 B1 | 5/2002 | Prasad et al. | |

OTHER PUBLICATIONS

Supplementary European Search Report, EP 97932453.0–2218–US9711563, Apr. 18, 2001.

Joshi, S.C. et al., "Hierarchical brain mapping via a generalized Dirichlet solution for mapping brain manifolds,"Vision Geometry IV, San Diego, CA, USA, Jul. 13–14, 1995, vol. 2573, pp. 278–289.

Banerjee, A. et al., "Accommodating anatomical variability in functional imaging via deformable templates,"Proceedings, 33$^{rd}$Annual Allerton Conference on Communication, Control and Computing, Monticello, IL, USA, Oct. 4–6, 1995, pp. 275–284.

PCT International Search Report, Jun. 5, 2001.

Davatzikos et al., "Image Registration Based on Boundary Mapping," Journal of Computer Assisted Tomography, 1993, 37 pages, vol. 15, 1, USA.

Joshi et al., "Hierarchical Brain Mapping Via a Generalized Dirichlet Solution for Mapping Brain Manifolds," Proceedings of the SPIE: The International Society for Optical Engineering, Vision Geometry IV, 1995, pp. 278–289, vol. 2573, USA.

Lavallee et al., "Matching of Medical Images for Computed and Robot Assisted Surgery," *TIMB–TIM3–IMAG, Faculte de Medecine de Grenoble*.

Kaufman et al., "New Head–Positioning System for Use with Computed Tomographic Scanning," *Neurosurgery*, vol. 7, No. 2, pp. 147–149 (1980).

Bajesy et al., Abstract, pp. 435–441 (1981).

Batnitzky et al., "Three–Dimensional Computer Rconstructions of Brian Lesions from Surface Contours Provided by Co9mputed Tomography: A Prospectus," *Neurosurgery*, vol. 11, No. 1, Part 1, pp. 73–84 (1982).

Kelly et al., "Pecision Resection of Intra–Axial CNS Lesions by CT–BAsed Stereotactic Craniotomy and Computer Monitored $CO_2$ Laser," *Acta Neurochirurgica*, 68, pp. 1–9 (1983).

Foley et al., "Fundamentals of Interactive Computer Graphics.".

PCT International Search Report, PCT/US99/12698, Oct. 21, 1999.

Thompson et al.; "Surface–Based Technique for Warping Three–DImensional Images of the Brain", IEEE, pp. 402–417, 1996.

* cited by examiner

METHOD AND APPARATUS FOR IMAGE REGISTRATION

This application is a continuation of U.S. patent application Ser. No. 08/678,628, filed on Jul. 10, 1996, issued as U.S. Pat. No. 6,009,212.

BACKGROUND OF THE INVENTION

The present invention relates to image processing systems and methods, and more particularly to image registration systems that combine two or more images into a composite image.

Image registration involves combining two or more images, or selected points from the images, to produce a composite image containing data from each of the registered images. During registration, a transformation is computed that maps related points among the combined images so that points defining the same structure in each of the combined images are correlated in the composite image.

Currently, practitioners follow two different registration techniques. The first requires that an individual with expertise in the structure of the object represented in the images label a set of landmarks in each of the images that are to be registered. For example, when registering two MRI images of different axial slices of a human head, a physician may label points, or a contour surrounding these points, corresponding to the cerebellum in two images. The two images are then registered by relying on a known relationship among the landmarks in the two brain images.

The mathematics underlying this registration process is known as small deformation multi-target registration. In the previous example of two brain images being registered, using a purely operator-driven approach, a set of N landmarks identified by the physician, represented by $x_i$, where $i=1 \ldots N$, are defined within the two brain coordinate systems. A mapping relationship, mapping the N points selected in one image to the corresponding N points in the other image, is defined by the equation $u(x_i)=k_i$, where $i=1 \ldots N$. Each of the coefficients, $k_i$, is assumed known.

The mapping relationship $u(x)$ is extended from the set of N landmark points to the continuum using a linear quadratic form regularization optimization of the equation:

$$u = arg \min_u \int \|Lu\|^2 \quad (1)$$

subject to the boundary constraints $u(x_i)=k_b$. The operator L is a linear differential operator. This linear optimization problem has a closed form solution. Selecting $L=\alpha\nabla^2+\beta\nabla$ ($\nabla\cdot$) gives rise to small deformation elasticity. For a description of small deformation elasticity see S. Timoshenko, *Theory of Elasticity*, McGraw-Hill, 1934 and R. L. Bisplinghoff, J. W. Marr, and T. H. H. Pian, *Statistics of Deformable Solids*, Dover Publications, Inc., 1965. Selecting $L=\nabla^2$ gives rise to a membrane or Laplacian model. Others have used this operator in their work, see e.g., Amit, U. Grenander, and M. Piccioni, "Structural image restoration through deformable templates," *J. American Statistical Association*. 86(414):376–387, June 1991, and R. Szeliski, *Bayesian Modeling of Uncertainty in Low-Level Vision*, Kluwer Academic Publisher, Boston, 1989 (also describing a bi-harmonic approach). Selecting $L=\nabla^4$ gives a spline or biharmonic registration method. For examples of applications using this operator see Grace Wahba, "*Spline Models for Observational Data*," Regional Conference Series in Applied Mathematics. SIAM, 1990, and F. L. Bookstein, *The Measurement of Biological Shape and Shape Change*, volume 24, Springer-Verlag: Lecture Notes in Biomathematics, New York, 1978.

The second currently-practiced technique for image registration uses the mathematics of small deformation multi-target registration and is purely image data driven. Here, volume based imagery is generated of the two targets from which a coordinate system transformation is constructed. Using this approach, a distance measure, represented by the expression D(u), represents the distance between a template T(x) and a target image S(x) The optimization equation guiding the registration of the two images using a distance measure is:

$$u = arg \min_u \int \|Lu\|^2 + D(u) \quad (2)$$

The distance measure D(u) measuring the disparity between imagery has various forms, e.g., the Gaussian squared error distance $\int |T(h(x))-S(x)|^2 dx$, a correlation distance, or a Kullback Liebler distance. Registration of the two images requires finding a mapping that minimizes this distance.

One limitation of the first approach to image registration is that the registration accuracy depends on the number and location of landmarks selected. Selecting too few landmarks may result in an inaccurate registration. Selecting too many landmarks does not necessarily guarantee accurate registration, but it does significantly increase the computational complexity of registration. Furthermore, it is not always possible to identify appropriate structural landmarks in all images.

The second technique is limited by the computational complexity presented by the number of data points in most images. The second technique is further limited by the fact that the process produces many local minima that confuse proper registration. This is because when registering two images according to the second technique, many possible orientations of the images produce subregions in the images that are properly matched, but the images as a whole are improperly registered.

There is, therefore, a need for a registration technique that overcomes the limitations of the conventional techniques.

SUMMARY OF THE INVENTION

The present invention overcomes the limitations of the conventional techniques by providing a methodology which combines, or fuses, some aspects of both Techniques. Specifically, the present invention uses landmark manifolds to produce a coarse registration, and subsequently incorporates image data to complete a fine registration of the template and target images.

Additional features and advantages of the invention will be set forth in the description which follows, and in part, will be apparent from the description, or may be learned by practicing the invention. The objectives and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, a method according to the invention for registering a template image and a target image comprises several steps, including defining manifold landmark points in the template image and identifying points in the target image corresponding to the defined manifold landmark points. Once these points have been identified, the method includes the steps of computing a transform relating the defined manifold landmark points in the template image to corresponding points in the target image; fusing the first transform with a distance measure to determine a second transform relating all points within a region of interest in the target image to the corresponding points in the template image; and registering the template image with the target image using this second transform.

Both the foregoing general description and the following detailed description are exemplary and explanatory and are intended to provide further explanation of the invention as claimed.

DESCRIPTION OF THE FIGURES

The accompanying drawings provide a further understanding of the invention. They illustrate embodiments of the invention and, together with the description, explain the principles of the invention.

DETAILED DESCRIPTION OF THE INVENTION

A method and system is disclosed which registers images using both landmark based knowledge and image data. Reference will now be made in detail to the present preferred embodiment of the invention, examples of which are illustrated in the accompanying drawings.

Figure 1:
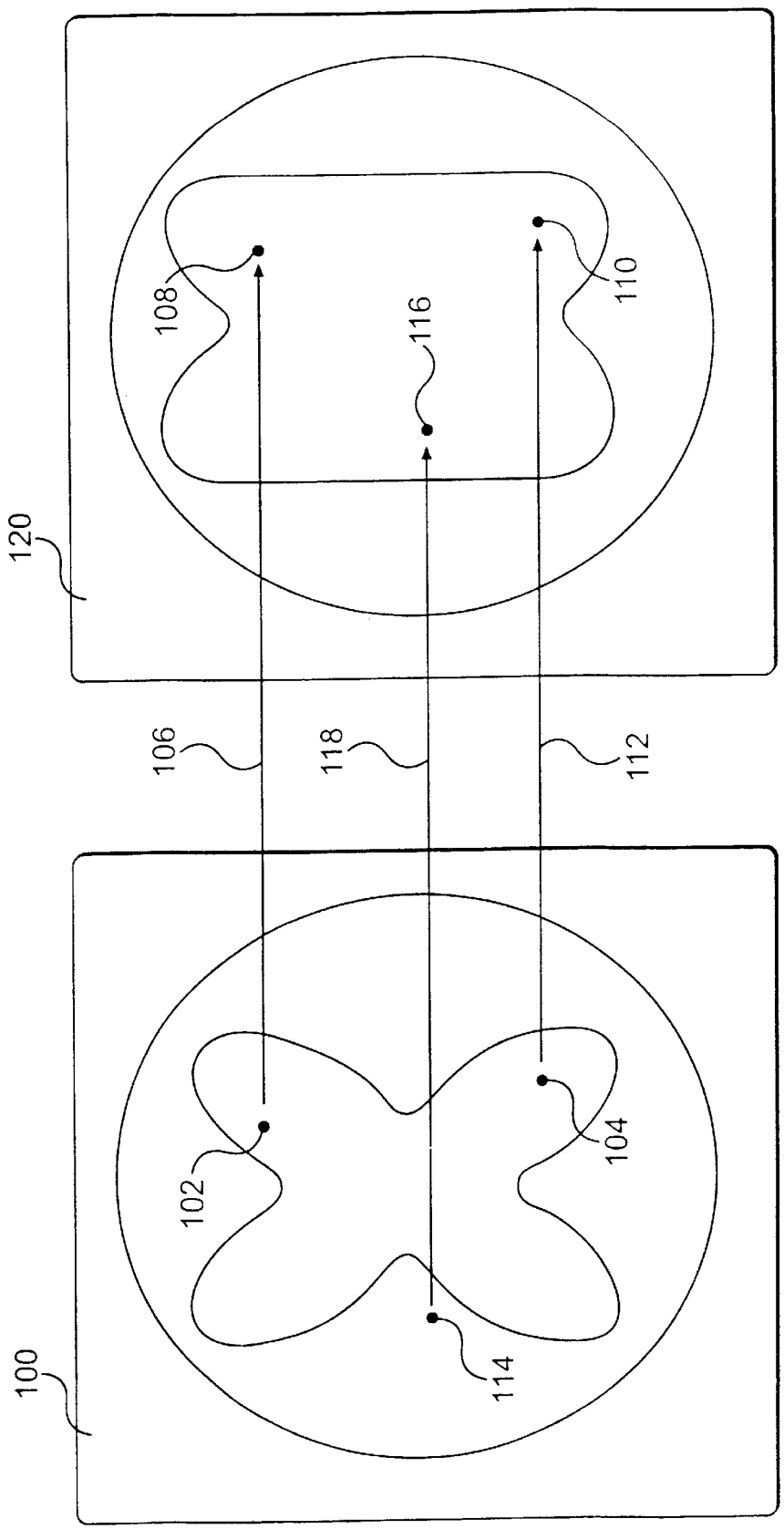
FIG. 1 is a target and template image of an axial section of a human head with 0-dimensional manifolds.

To illustrate the principles of this invention, FIG. 1 shows two axial views of a human head. In this example, template image 100 contains points 102, 104, and 114 identifying structural points (0-dimensional landmark manifolds) of interest in the template image. Target image 120 contains points 108, 110, 116, corresponding respectively to template image points 102, 104, 114, via vectors 106, 112, 118, respectively.

Figure 2:
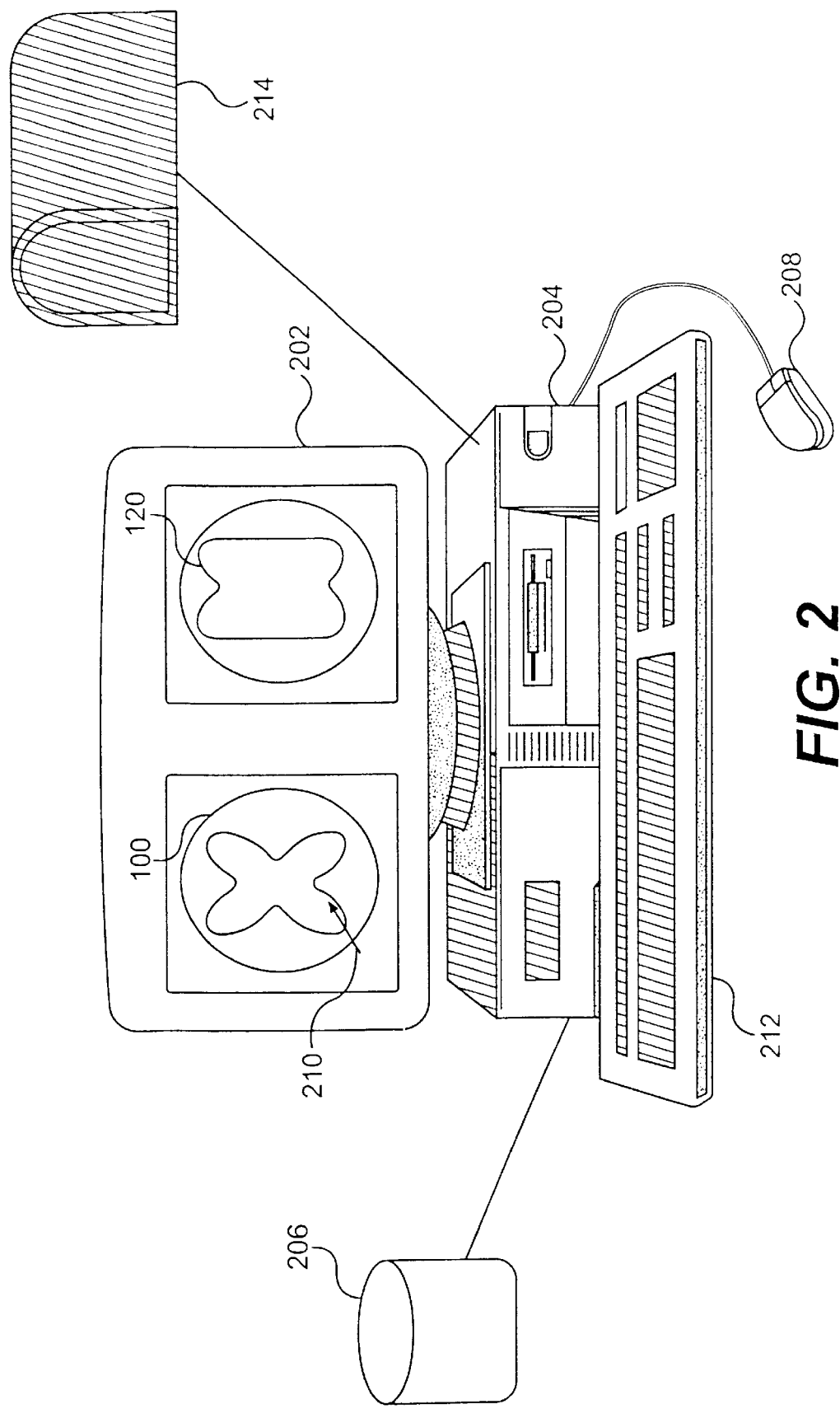
FIG. 2 is schematic diagram illustrating an apparatus for registering, images in accordance with the present invention.

FIG. 2 shows apparatus to carry out preferred embodiment of this invention. A medical imaging scanner 214 obtains the images show in FIG. 1 and stores them on a computer memory 206 which is connected to a computer central processing unit (CPU) 204. One of ordinary skill in the art will recognize that a parallel computer platform having multiple CPUs is also a suitable hardware platform for the present invention, including, but not limited to, massively parallel machines and workstations with multiple processors. Computer memory 206 can be directly connected to CPU 204, or this memory can be remotely connected through a communications network.

Registering images 100, 120 according to the present invention, unifies registration based on landmark deformations and image data transformation using a coarse-to-fine approach. In this approach, the highest dimensional transformation required during registration is computed from the solution of a sequence of lower dimensional problems driven by successive refinements. The method is based on information either provided by an operator, stored as defaults, or determined automatically about the various substructures of the template and the target, and varying degrees of knowledge about these substructures derived from anatomical imagery, acquired from modalities like CT, MRI, functional MRI, PET, ultrasound, SPECT, MEG, EEG, or cryosection.

Following this hierarchical approach, an operator, using pointing device 208, moves cursor 210 to select points 102, 104, 114 in FIG. 1, which are then displayed on a computer monitor 202 along with images 100, 120. Selected image points 102, 104, and 114 are 0-dimensional manifold landmarks.

Once the operator selects manifold landmark points 102, 104, and 114 in template image 100, the operator identifies the corresponding template image points 108, 110, 116.

Once manifold landmark selection is complete, CPU 204 computes a first transform relating the manifold landmark points in template image 100 to their corresponding image points in target image 120. Next, a second CPU 204 transform is computed by fusing the first transform relating selected manifold landmark points with a distance measure relating all image points in both template image 100 and target image 120. The operator can select an equation for the distance measure several ways including, but not limited to, selecting an equation from a list using pointing device 208, entering into CPU 204 an equation using keyboard 212, or reading a default equation from memory 206. Registration is completed by CPU 204 applying the second computed transform to all points in the template image 100.

Although several of the registration steps are described as selections made by an operator, implementation of the present invention is not limited to manual selection. For example, the transforms, boundary values, region of interest, and distance measure can be defaults read from memory or determined automatically.

Figure 3:
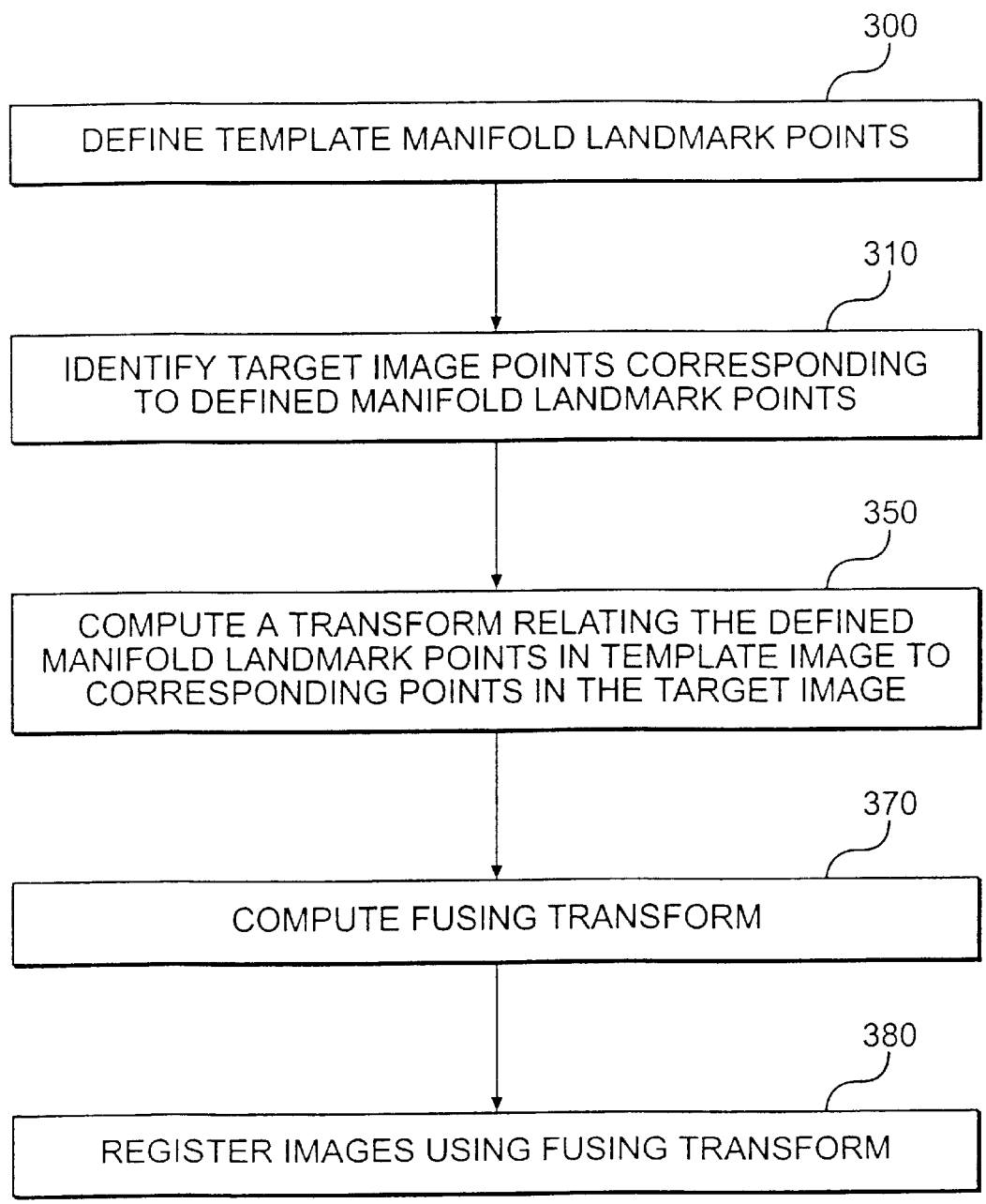
FIG. 3 is a flow diagram illustrating the method of image registration according to the present invention.

FIG. 3 illustrates the method of this invention in operation. First an operator defines a set of N manifold landmark points $x_i$, where i=1, ..., N, represented by the variable M, in the template image (step 300). These points should correspond to points that are easy to identify in the target image.

Associated with each landmark point, $x_i$, in the template image, is a corresponding point $y_i$ in the target image. The operator therefore next identifies the corresponding points, $y_i$, in the target image are identified (step 310). The nature of this process means that the corresponding points can only be identified within some degree of accuracy. This mapping between the template and target points can be specified with a resolution having a Gaussian error of variance $\sigma^2$.

If a transformation operator has not been designated, the operator can choose a manifold landmark transformation operator, L, for this transformation computation. In this embodiment, the Laplacian $$\left(\nabla = \frac{\partial^2}{\partial x_1^2} + \frac{\partial^2}{\partial x_2^2} + \frac{\partial_2}{\partial_3^2}\right)$$

is used for the operator L. Similarly, the operator can also select boundary values for the calculation corresponding to assumed boundary conditions, if these values have not been automatically determined or stored as default values. Here, infinite boundary conditions are assumed, producing the following equation for K, where $K(x,x_i)$ is the Green's function of a manifold landmark transformation operator $L^2$ (assuming L is self-adjoint):

$$K(x, x_i) = \begin{bmatrix} \|x - x_i\| & 0 & 0 \\ 0 & \|x - x_i\| & 0 \\ 0 & 0 & \|x - x_i\| \end{bmatrix}. \tag{3}$$

Using circulant boundary conditions instead of infinite boundary conditions provides and embodiment suitable for rapid computation. One of ordinary skill in the art will recognize that other operators can be used in place of the Laplacian operator, such operators include, but are not limited to, the biharmonic operator, linear elasticity operator, and other powers of these operators.

In addition, the operator may select a region of interest in the target image. Restricting the computation to a relatively small region of interest reduces both computation and storage requirements because transformation is computed only over a subregion of interest. It is also possible that in some applications the entire image is the desired region of interest. In other applications, there may be default regions of interest that are automatically identified.

The number of computations required is proportional to the number of points in the region of interest, so the computational savings equals the ratio of the total number of points in the image to the number of points in the region of interest. The data storage savings for an image with N points with a region of interest having M points is a factor of N/M. For example, for a volume image of 256×256×256 points with a region of interest of 128×128×128 points, the computation time and the data storage are reduced by a factor of eight.

In addition, performing the computation only over the region of interest makes it necessary only to store a subregion, providing a data storage savings for the template image, the target image, and the transform values.

Following the identification of template manifold landmark points and corresponding points in the target image, as well as selection of the manifold transformation operator, the boundary values, and the region of interest, CPU 204 computes a transform that embodies the mapping relationship between these two sets of points (step 350). This transform can be estimated using Bayesian optimization, using the following equation:

$$\hat{u} = \arg\min_u \int_\Omega \|Lu\|^2 + \sum_{i=1}^N \frac{|y_i - x_i + u(x_i)|^2}{\sigma_i^2}, \tag{4}$$

the minimizer, u, having the form $$\hat{u}(x) = b + Ax + \sum_{i=1}^N \beta_i K(x, x_i) \tag{5}$$

where A is a 3×3 matrix, $b=[b_1, b_2, b_3]$ is a 3×1 vector, $[\beta_{i1}, \beta_{i2}, \beta_{i3}]$ is a 3×1 weighting vector.

The foregoing steps of the image registration method provide a coarse matching of a template and a target image. Fine matching of the images requires using the full image data and the landmark information and involves selecting a distance measure by solving a synthesis equation that simultaneously maps selected image landmarks in the template and target images and matches all image points within a region of interest. An example of this synthesis equation is:

$$\hat{u} = \arg\min_u \gamma \int_\Omega |T(x - u(x)) - S(x)|^2 dx + \tag{6}$$

$$\int_\Omega \|Lu\|^2 + \sum_{i=1}^N \frac{|y_i - x_i + u(x_i)|^2}{\sigma_i^2}$$

here the displacement field u is constrained to have the form $$u(x) = \sum_{k=0}^d \mu_k \varphi_k(x) + \sum_{i=1}^N \beta_i K(x, x_i) + Ax + b \tag{7}$$

with the variables $\beta_i$, A, and b, computed at step 350 in FIG. 3. The operator L in equation (6) may be the same operator used in equation (4), or alternatively, another operator may be used with a different set of boundary conditions. The basis functions φ are the eigen functions of operators such as the Laplacian $Lu=\nabla^2 u$, the bi-harmonic $Lu=\nabla^4 u$, linear elasticity $Lu=\alpha\nabla^2 u+(\alpha+\beta)\nabla(\nabla\cdot u)$, and powers of these operators $L^p$ for $p\geq 1$.

One of ordinary skill in the art will recognize that there are many possible forms of the synthesis equation. For example, in the synthesis equation presented above, the distance measure in the first term measures the relative position of points in the target image with respect to points in the template image. Although this synthesis equation uses a quadratic distance measure, one of ordinary skill in the art will recognize that there are other suitable distance measures.

CPU 204 then computes a second or fusing transformation (Step 370) using the synthesis equation relating all points within a region of interest in the target image to all corresponding points in the template image. The synthesis equation is defined so that the resulting transform incorporates, or fuses, the mapping of manifold landmarks to corresponding target image points determined when calculating the first transform.

The computation using the synthesis equation is accomplished by solving a sequence of optimization problems from coarse to fine scale via estimation of the basis coefficients $\mu_k$. This is analogous to multi-grid methods, but here the notion of refinement from coarse to fine is accomplished by increasing the number of basis components d. As the number of basis functions increases, smaller and smaller variabilities between the template and target are accommodated. The basis coefficients are determined by gradient descent, i.e., $$\mu_k^{(n+1)} = \mu_k^{(n)} - \Delta \partial H(u^{(n)}|S\frac{)}{\partial \mu_k} \qquad (8)$$

where $$\frac{\partial H(u^{(n)})}{\partial \mu_k} = -\gamma \int_\Omega (T(x - u^{(n)}(x)) - S(x))\nabla T(x - u^{(n)}(x)) \cdot \varphi_k(x) dx + \qquad (9)$$

$$\lambda_k^2 \mu_k^{(n)} + \left(2\sum_{i=1}^N \frac{y_i - x_i + u^{(n)}(x_i)}{\sigma_i^2}\right) \cdot \varphi_k(x)$$

and $$u^{(n)}(x) = \sum_{k=0}^d \mu_k^{(n)} \varphi_k(x) + \sum_{i=1}^N \beta_i K(x, x_i) + Ax + b \qquad (10)$$

also $\Delta$ is a fixed step size and $\lambda_k$ are the eigenvalues of the eigenvectors $\phi_k$.

Figure 8:
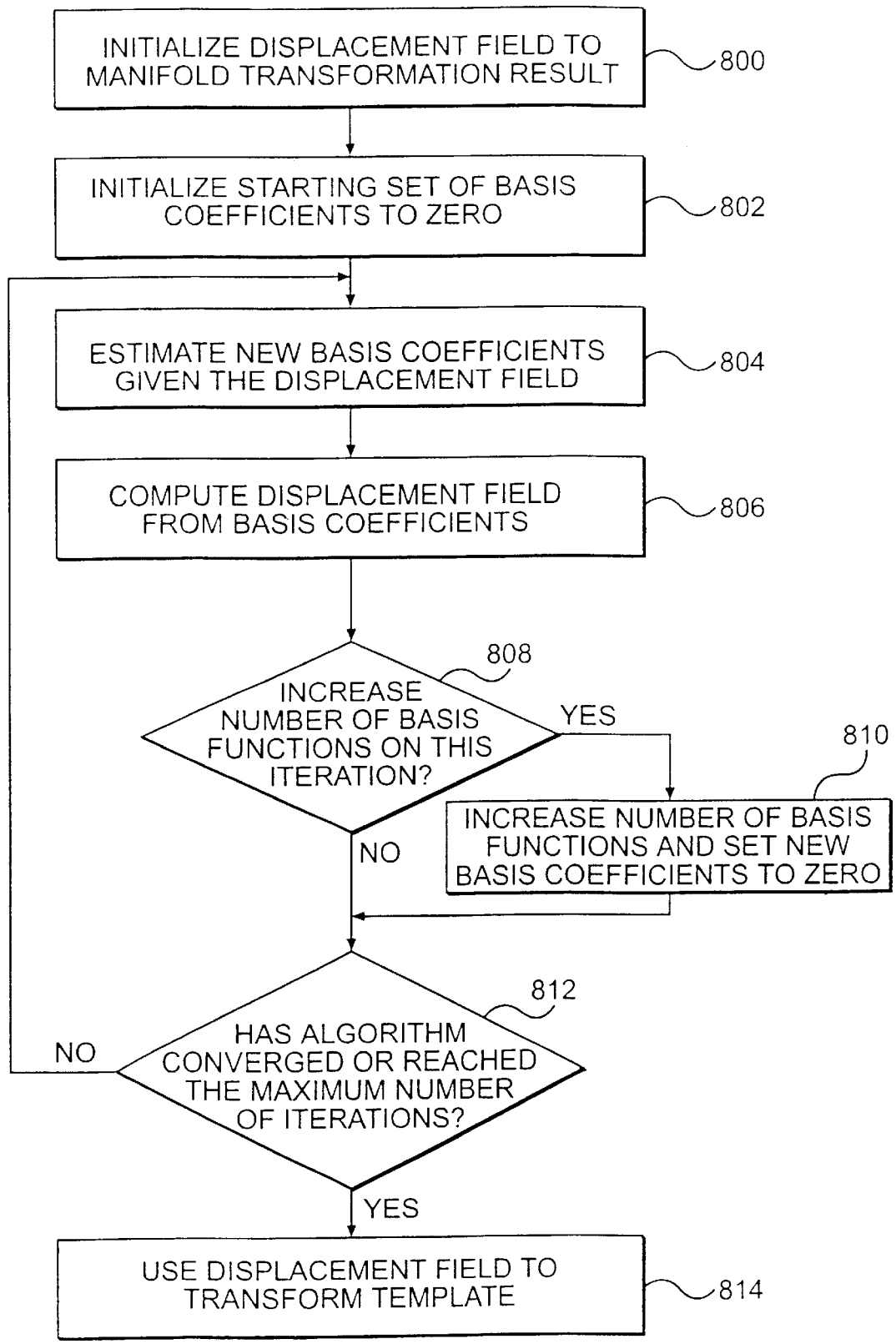
FIG. 8 is a flow diagram illustrating the computation of a fusing transform.

The computation of the fusion transformation (step 370) using the synthesis equation is presented in the flow chart of FIG. 8. Equation (7) is used to initialize the value of the displacement field $u(x)=u^{(0)}(x)$ (step 800). The basis coefficients $\mu_k = \mu_k^{(0)}$ are set equal to zero and the variables $\beta_i$, A, and b are set equal to the solution of equation (6) (step 802). Equation (8) is then used to estimate the new values of the basis coefficients $\mu_k^{(n+1)}$ given the current estimate of the displacement field $u^{(n)}(x)$ (step 804). Equation (10) is then used to compute the new estimate of the displacement field $u^{(n)}(x)$ given the current estimate of the basis coefficients $\mu_k^{(n)}$ (step 806). The next part of the computation is to decide whether or not to increase the number d of basis functions $\phi_k$ used to represent the transformation (step 808). Increasing the number of basis functions allows more deformation. Normally, the algorithm is started with a small number of basis functions corresponding to low frequency eigen functions and then on defined iterations the number of frequencies is increased by one (step 810). This coarse-to-fine strategy matches larger structures before smaller structures. The preceding computations (steps 804–810) are repeated until the computation has converged or the maximum number of iterations is reached (step 812). The final displacement field is then used to transform the template image (step 814).

Once CPU 204 determines the transform from the synthesis equation fusing both landmark manifold information and image data, CPU 204 uses this transform to register the template image with the target image (step 380).

The spectrum of the second transformation, h, is highly concentrated around zero. This means that the spectrum mostly contains low frequency components. Using the sampling theorem, the transformation can be represented by a subsalmpled version provided that the sampling frequency is greater than the Nyquist frequency of the transformation. The computation may be accelerated by computing the transformation on a coarse grid and extending it to the full voxel lattice e.g., in the case of 3D images, by interpolation. The computational complexity of the algorithm is proportional to the dimension of the lattice on which the transformation is computed. Therefore, the computation acceleration equals the ratio of the full voxel lattice to the coarse computational lattice.

Another way to increase the efficiency of the algorithm is to precompute the Green's functions and eigen functions of the operator L and store these precomputed valves in a lookup table. These tables replace the computation of these functions at each iteration with a table lookup. This approach exploits the symmetry of Green's functions and eigen functions of the operator L so that very little computer memory is required. In the case of the Green's functions, the radial symmetry is exploited by precomputing the Green's function only along a radial direction.

The method described for fusing landmark information with the image data transformation can be extended from landmarks that are individual points (0-dimensional manifolds) to manifolds of dimensions 1, 2 and 3 corresponding to curves (1-dimensional), surfaces (2-dimensional) and subvolumes (3-dimensional).

Figure 4:
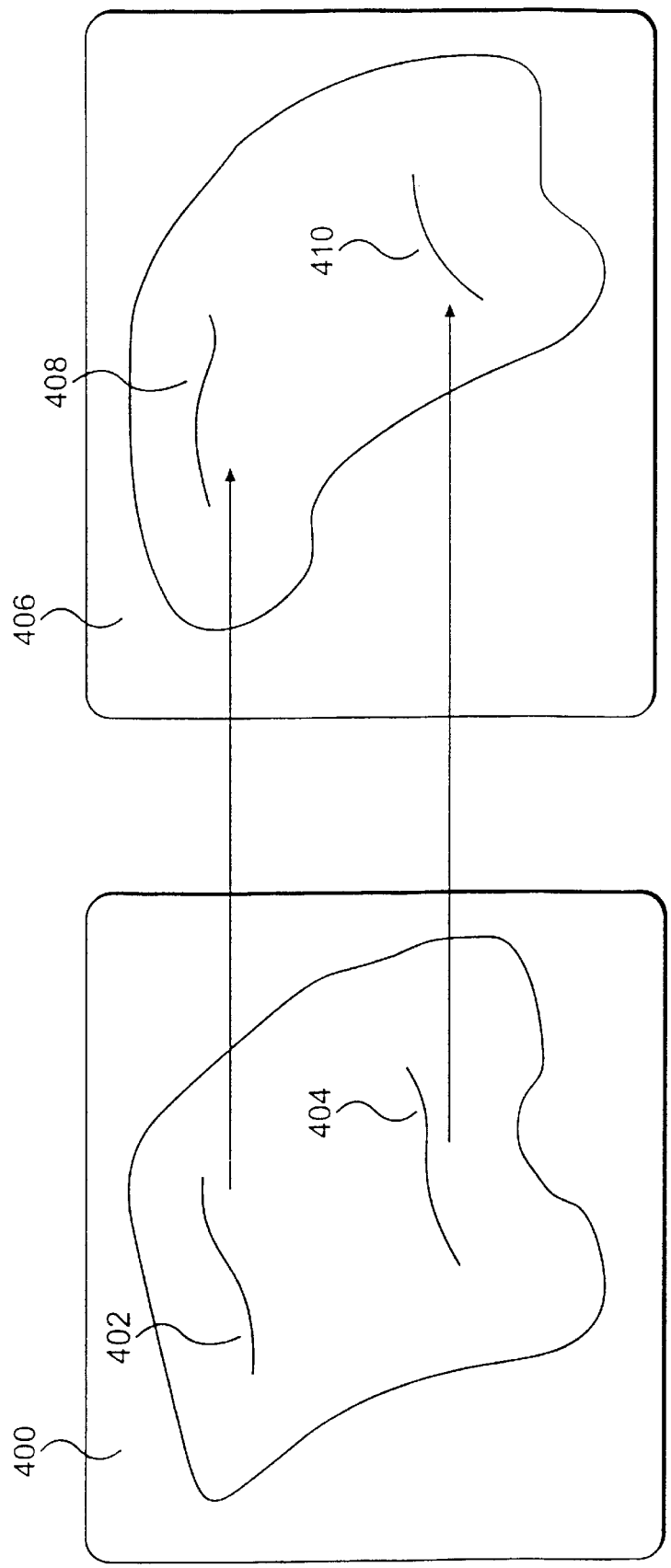
FIG. 4 is a target and a template image with 1-dimensional manifolds.
Figure 5:
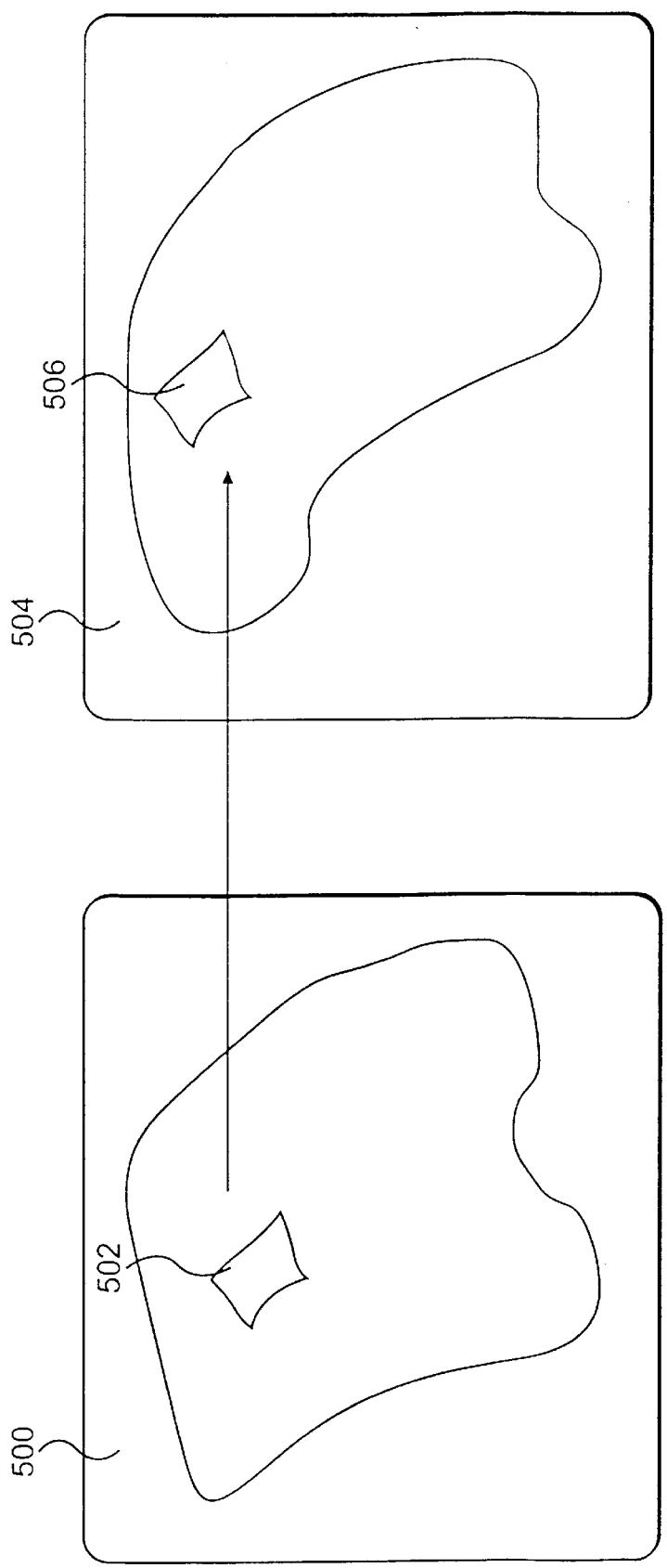
FIG. 5 is a target and a template image with 2-dimensional manifolds.
Figure 6:
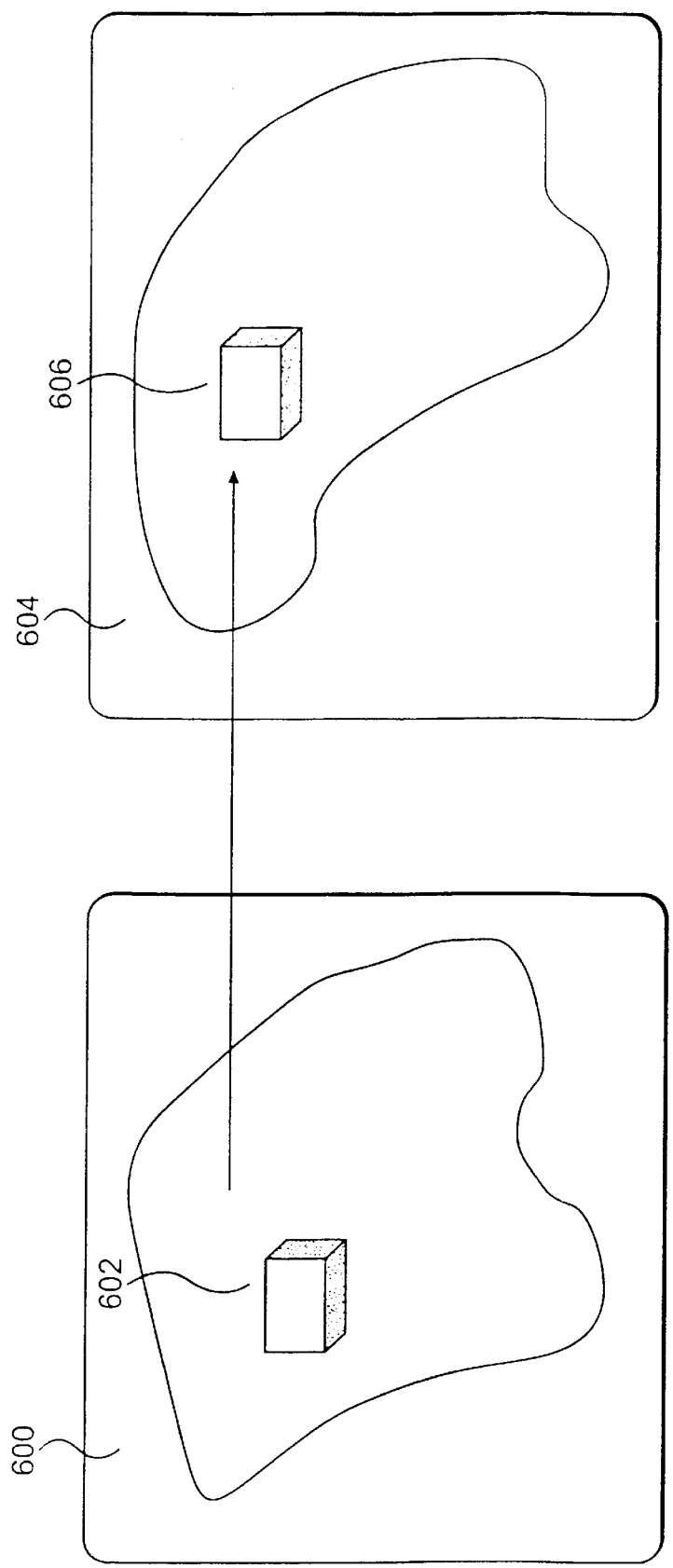
FIG. 6 is a target and a template image with 2-dimensional manifolds.

For example, FIG. 4 shows a template image 400 of a section of a brain with 1-dimensional manifolds 402 and 404 corresponding to target image 406 1-dimensional manifolds 408 and 410 respectively. FIG. 5 shows a template image 500 of a section of a brain with 2-dimensional manifold 502 corresponding to target image 504 2-dimensional manifold 506. FIG. 6 shows a template image 600 of a section of a brain with 3-dimensional As with the point landmarks, these higher dimensional manifolds condition the transformation, that is we assume that the vector field mapping the manifolds in the template to the data is given. Under this assumption the manually-assisted deformation (step 350, FIG. 3) becomes the equality-constrained Bayesian optimization problem:

$$u(x) = \arg\min_u \int_\Omega |Lu(X)|^2 dx \qquad (11)$$

subject to $$u(x) = k(x), x \in \bigcup_{i=0}^3 M(i). \qquad (12)$$

If M(I) is a smooth manifold for i=0, 1, 2, 3, the solution to this minimization is unique satisfying $L^\dagger L\hat{u}(x)=0$, for all template points in the selected manifold. This implies that the solution can be written in the form of a Fredholm integral equation:

$$\hat{u}(x) = \int_{\bigcup_{i=0}^3 M(i)} K(x, y)\beta(y) dS(y), \text{ where } K = GG^t \qquad (13)$$

and G the Green's function of L.

When the manifold is a sub-volume, M(3), dS is the Lebesgue measure on $\mathbb{R}^3$. For 2-dimensional surfaces, dS is the surface measure on M(2), For 1-dimensional manifolds (curves), dS is the line measure on M(1) and for point landmarks, M(0), dS is the atomic measure. For point landmarks, the Fredholm integral equation degenerates into a summation given by equation (5).

When the manifold of interest is a smooth, 2-dimensional surface, the solution satisfies the classical Dirichlet boundary value problem:

$$L^\dagger L\hat{u}(x)=0, \forall x \in \Omega \setminus M \qquad (14)$$

The Dirichlet problem is solved using the method of successive over relaxation as follows. If $u^k(x)$ is the estimate of a deformation field at the $k^{th}$ iteration, the estimate at the $(k+1)^{th}$ iteration is given by the following update equation:

$$u^{k+1}(x)=u^k(x)+\alpha L, \ ^{\dagger}Lu(x), x\in\Omega\setminus M. \ u^{k+1}(x)=k(x), x\in M, \quad (15)$$

where $\alpha$ is the over relaxation factor.

It is also possible to compute the transform (step 370) with rapid convergence by solving a series of linear minimization problems where the solution to the series of linear problems converges to the solution of the nonlinear problem. This avoids needing to solve the nonlinear minimization problem directly. Using a conjugate gradient method, the computation converges faster than a direct solution of the synthesis equation because the basis coefficients $\mu_k$ are updated with optimal step sizes.

Using the conjugate gradient, the displacement field is assumed to have the form $$u(x) = \sum_{k=0}^{d} \mu_k \varphi_k(x) + f(x) \quad (16)$$

where $$f(x) = \sum_{i=1}^{N} \beta_i K(x, x_i) + Ax + b. \quad (17)$$

Begin by assuming that f(x) is fixed. This is generalized below. The eigen functions in the expansion are all real and follow the assumption that $\{(\phi_r(x)\}$ are $\mathbb{R}^3$ valued.

The minimization problem is solved by computing $$\mu_j^{new}=\mu_j^{old}+\Delta_j=0. \ldots d \quad (18)$$

to update the basis coefficients in equation (16) where $\mu_j=0$, $j=0 \ldots d$ initially, $_j\Delta$ is computed using the equation $$\Delta j = \left( \int_{\Omega} \left( \sum_{k=0}^{d} h_k(x) \right) h_j(x) dx + \right.$$

$$\lambda_j^2 + \frac{1}{\sigma^2} \sum_{i=1}^{N} \theta_{jj}(x_i) \Bigg)^{-1} \left( \int_{\Omega} (T(x-u(x)) - S(x)) h_j(x) dx \sum_{i=1}^{N} \beta_i - \right.$$

$$\varphi_j(x_i) + \frac{1}{\sigma^2} \sum_{i=1}^{N} (y_i - x_i + u(x_i)) \cdot \varphi_j(x_i) +$$

$$\left. \frac{1}{\sigma^2} \sum_{k=0}^{j-1} \Delta k \sum_{i=N}^{N} \theta_{kj}(x_i) \right). \quad (19)$$

where $h_i(x)=\nabla T|_{x-u(x)} \cdot \phi_i(x)$, and where $\theta_{ij}(x)=\phi_j(x) \cdot \phi_j(x)$. The notation f·g is the inner-product, i.e., $$f \cdot g = \sum_{i=1}^{3} f_i g_i \text{ for } f, g \in R^3.$$

Similarly, since u(x) is written in the series expansion given in equations (16) and (17), the identical formulation for updating $\beta_i$ arises. Accordingly, the fusion achieved by the present invention results. Computation of equation (18) repeats until all $\Delta_j$ fall below a predetermined threshold solving for each $\Delta_j$ in sequence of increasing j, and $\Delta_j$ is computed using the values of $\Delta_k$ for $0 \leq k < j$.

A further improvement over prior art image registration methods is achieved by computing the required transforms using fast Fourier transforms (FFT). Implementing an FFT based computation for image registration using a synthesis equation, as required at step 370 of FIG. 3, provides computational efficiency. However, to exploit the known computational efficiencies of FFT transforms, the solution of the synthesis equation must be recast to transform the inner products required by iterative algorithms into shift invariant convolutions.

To make the inner-products required by the iterative algorithms into shift invariant convolution, differential and difference operators are defined on a periodic version of the unit cube and the discrete lattice cube. Thus, the operators are made cyclo-stationary, implying their eigen functions are always of the form of complex exponentials on these cubes having the value:

$$\Psi_k^{(r)} = \begin{bmatrix} c_{1k}^{(r)} \\ c_{2k}^{(r)} \\ c_{3k}^{(r)} \end{bmatrix} e^{j\langle \omega_k, x \rangle}. \quad (20)$$

r=1, 2, 3 with $x=(x_1,x_2,x_3)\in[0, 1]^3$,
$\omega_k=(\omega_{k_1},\omega_{k_2}, \omega_{k_3})$
$\omega_{ki}=2k_i$, i=1, 2, 3, and the Fourier basis for periodic functions on $[0, 1]^3$ takes the form
$e^{j\langle\omega_k,x\rangle}$, $\langle\omega_k,x\rangle=\omega_{k_1}x_1+\omega_{k_2}x_2+\omega_{k_3}x_3$. On the discrete $N^3$=periodic lattice, $$\omega_k = \left( \frac{2\pi k_1}{N}, \frac{2\pi k_2}{N}, \frac{2\pi k_3}{N} \right), x \in \{0, 1 \ldots N-1\}^3.$$

For real expansions, the eigen vectors becomes $\phi_k(x)=\Psi_k(x)+\Psi_k^*(x)$ and the real expansion in equation (16) becomes:

$$u(x) = \sum_{k=0}^{d} \mu_k (\Psi_k(x) + \Psi_k^*(x)) \quad (21)$$

where * means complex conjugate.

This reformulation supports an efficient implementation of the image registration process using the FFT. Specifically, if step 370 of FIG. 3, computing the registration transform fusing landmark and image data, is implemented using the conjugate gradient method, the computation will involve a series of inner products. Using the FFT exploits the structure of the eigen functions and the computational efficiency of the FFT to compute these inner-products.

For example, one form of a synthesis equation for executing Step 370 of FIG. 3 will include the following three terms:

$$\int_{\Omega}(T(x-u(x))-S(x))h_j(x)dx \quad \text{Term 1}$$

$$\text{Term 2}: \int_{\Omega}\left(\sum_{k=0}^{d} h_k(x)\right)h_j(x)dx$$

$$\text{Term 3}: u(x) = \sum_{k=0}^{d} \mu_k \varphi_k(x)$$

Each of theses terms must be recast in a suitable form for FFT computation. One example of a proper reformulation for each of these terms is:

Term 1

$$\int_{\Omega} (T(x-u(x)) - S(x)) - S(x)) \nabla T \cdot \left( \Psi_l^p(x) + \Psi_1^{(r)^e}(x) \right) dx = \qquad (22)$$

$$2\text{Re}\left( \int_{\Omega} (T(x-u(x)) - S(x)) \left( \sum_{r=1}^{3} \nabla T \cdot c_k^{(r)} \right) e^{j\langle \omega_e, x \rangle} dx \right),$$

where $c_k^{(r)} = [c_{1k}^{(r)}, c_{2k}^{(r)}, c_{3k}^{(r)}]^t$. This equation is computed for all k by a Fourier transformation of the function.

$$(T(x-u(x)) - S(x)) \left( \sum_{r=1}^{3} \nabla T \cdot c_k^{(r)} \right) \qquad (23)$$

and hence can be computed efficiently using a 3-D FFT.

Term 2

$$\sum_{r=1}^{3} \sum_{k=0}^{d} \int (\Psi_j^{(r)} + \Psi_j^{(r)*})^t (\nabla T (\nabla T)^t)(\Psi_j^{(r)} + \Psi_j^{(r)*}) dx = \qquad (24)$$

$$2\text{Re}\left( \sum_{r=1}^{3} \sum_{k=0}^{d} (c_k^{(r)})^t \left( \int_{\Omega} (\nabla T (\nabla T)^t) e^{(\omega_k + \omega_j, x)} dx \right) c_j^{(r)} \right)$$

The integral in the above summation for all k can be computed by Fourier transforming the elements of the 3×3 matrix:

$$\nabla T(\nabla T)^t \qquad (25)$$

evaluated at $\omega_k + \omega_j$. Because this matrix has diagonal symmetry, the nine FFTs in this reformulation of term 2 can be computed efficiently using six three dimensional FFTs evaluated at $\omega_k + \omega_j$.

Term 3

Using the exact form for the eigen functions we can rewrite the above equation as $$u(x) = 2\text{Re}\left( \sum_{r=1}^{3} \sum_{k=0}^{d} \mu_k^{(r)} \begin{bmatrix} c_{1k}^{(r)} \\ c_{2k}^{(r)} \\ c_{3k}^{(r)} \end{bmatrix} e^{j\langle \omega_k, x \rangle} \right). \qquad (26)$$

This summation is precisely the inverse Fourier transforms of the functions $$\sum_{r=1}^{3} \mu_k^{(r)} c_{ik}^{(r)} \text{ for } i = 1, 2, 3$$

and hence can be computed efficiently by using 3-D inverse FFT.

One of ordinary skill in the art will recognize that restructuring the computation of registration transforms using FFTs will improve the performance of any image registration method having terms similar to those resulting from a synthesis equation fusing landmark and image data. Improvement results from the fact that many computer platforms compute FFTs efficiently; accordingly reformulating the registration process as an FFT computation, makes the required computations feasible.

A distance function used to measure the disparity between images is the Gaussian square error distance $\int |T(x-u(x)) - S(x)|^2 dx$. There are many other forms of an appropriate distance measure. More generally, distance functions, such as the correlation distance, or the Kullback Liebler distance, can be written in the form $\int D(T(x-u(x)), S(x)) dx$.

An efficient convolution implementation can be derived using the FFT for arbitrary distance functions. Computing the fusing transform using the image data follows the equation:

$$\hat{u} = \underset{u}{\operatorname{argmin}} \gamma \int_{\Omega} D(T(x-u(x)), S(x)) dx + \qquad (27)$$

$$\int_{\Omega} |Lu|^2 + \sum_{i=1}^{N} \frac{|y_i - x_i + u(x_i)|^2}{\sigma_i^2}$$

where $D(.,.)$ is a distance function relating points in the template and target images. The displacement field is assumed to have the form:

$$u(x) = \sum_{k=0}^{d} \mu_k \varphi_k(x) + f(x) \qquad (28)$$

where $$f(x) = b + Ax + \sum_{i=1}^{N} \beta_i K(x, x_i) \qquad (29)$$

is fixed. The basis coefficients $\{\mu_k\}$ are determined by gradient descent, i.e., $$\mu_k^{(n+1)} = \mu_k^{(n)} - \Delta \frac{\partial H(u^{(n)}|S)}{\partial u_k} \qquad (30)$$

where the gradient is computed using the chain rule and is given by the equation $$\frac{\partial H(u^{(n)})}{\partial \mu_k} = \int_{\Omega} D'(T(x-u^{(n)}(x)), S(x)) \nabla T(x-u^{(n)}(x)) \cdot \varphi_k(x) dx + \qquad (31)$$

$$\lambda_k^2 \mu_k^{(n)} + \left( 2 \sum_{i=1}^{N} \frac{y_i - x_i + u^{(n)}(x_i)}{\sigma_i^2} \right) \cdot \varphi_k(x)$$

where $D'(.,.)$ is the derivative with respect to the first argument. The most computationally intensive aspect of the algorithm is the computation of the term $$\int_{\Omega} D'(T(x-u^{(n)}(x)), S(x)) \nabla T(x-u^{(n)}(x)) \cdot \varphi_k(x) dx$$

Using the structure of the eigen functions and the computational efficiency of the FFT to compute these inner-products, the above term can be written as $$2\text{Re} \int_{\Omega} D'(T(x-u^{(n)}(x)), S(x)) \left( \sum_{r=1}^{3} \nabla T \cdot c_k^{(r)} \right) e^{j\langle \omega_k, x \rangle} dx$$

where $c_k^{(r)} = [c_{1k}^{(r)}, c_{2k}^{(r)}, c_{3k}^{(r)}]^t$. This equation is computed for all k by a Fourier transformation of the function $$D'(T(x - u^{(n)}(x)), S(x)) \left( \sum_{r=1}^{3} \nabla T \cdot c_k^{(r)} \right)$$

and hence can be computed efficiently using a 3-D FFT.

The following example illustrates the computational efficiencies achieved using FFTs for image registration instead of direct computation of inner-products. Assuming that a target image is discretized on a lattice having $N^3$ points, each of the inner-products in the algorithm, if computed directly, would have a computational complexity of the order $(N^3)^2$. Because the inner-products are computationally intensive, the overall complexity of image registration is also $(N^3)^2$. In contrast, each of the FFTs proposed has a computational complexity on the order of $N^3 \log_2 N^3$. The speed up is given by the ratio $N^6/(N^3 \log_2 N^3) = N^3/(3 \log_2 N)$. Thus the speed up is 64 times for a 16×16×16 volume and greater than $3.2 \times 10^4$ speed up for a 256×256×256 volume.

A further factor of two savings in computation time can be gained by exploiting the fact that all of the FFTs are real. Hence all of the FFTs can be computed with corresponding complex FFTs of half the number of points. For a development of the mathematics of FFTs see, A. V. Oppenheim and R. W. Schafer, *Digital Signal Processing,* Prentice-Hall, New Jersey, 1975.

Alternative embodiments of the registration method described can be achieved by changing the boundary conditions of the operator. In the disclosed embodiment, the minimization problem is formulated with cyclic boundary conditions. One of ordinary skill in the art will recognize that alternative boundary conditions, such as the Dirichlet, Neumann, or mixed Dirichlet and Neumann boundary conditions are also suitable. The following equation is used in an embodiment of the present invention using one set of mixed Dirichlet and Neumann boundary conditions:

$$\left(\frac{\partial u_t}{\partial x_i}\right)\bigg|_{(x/x_i=k)} = u_i(x/x_i = k) = 0 \text{ for } i, j = 1, 2, 3; \quad i \neq j; \quad k = 0, 1: \quad (32)$$

where the notation $(x|x_i=k)$ means x is in the template image such that $x_i=k$. In this case, the eigen functions would be of the form:

$$\varphi_k^{(r)} = \begin{bmatrix} C_{1k}^{(r)} \cos\omega_{k1} x_1 \sin\omega_{k2} \sin\omega_{k3} x_3 \\ C_{2k}^{(r)} \sin\omega_{k1} x_1 \cos\omega_{k2} \sin\omega_{k3} x_3 \\ C_{3k}^{(r)} \sin\omega_{k1} x_1 \sin\omega_{k2} \cos\omega_{k3} x_3 \end{bmatrix} \text{ for } r = 1, 2, 3. \quad (33)$$

Modifying boundary conditions requires modifying the butterflies of the FFT from complex exponentials to appropriate sines and cosines.

Figure 7:
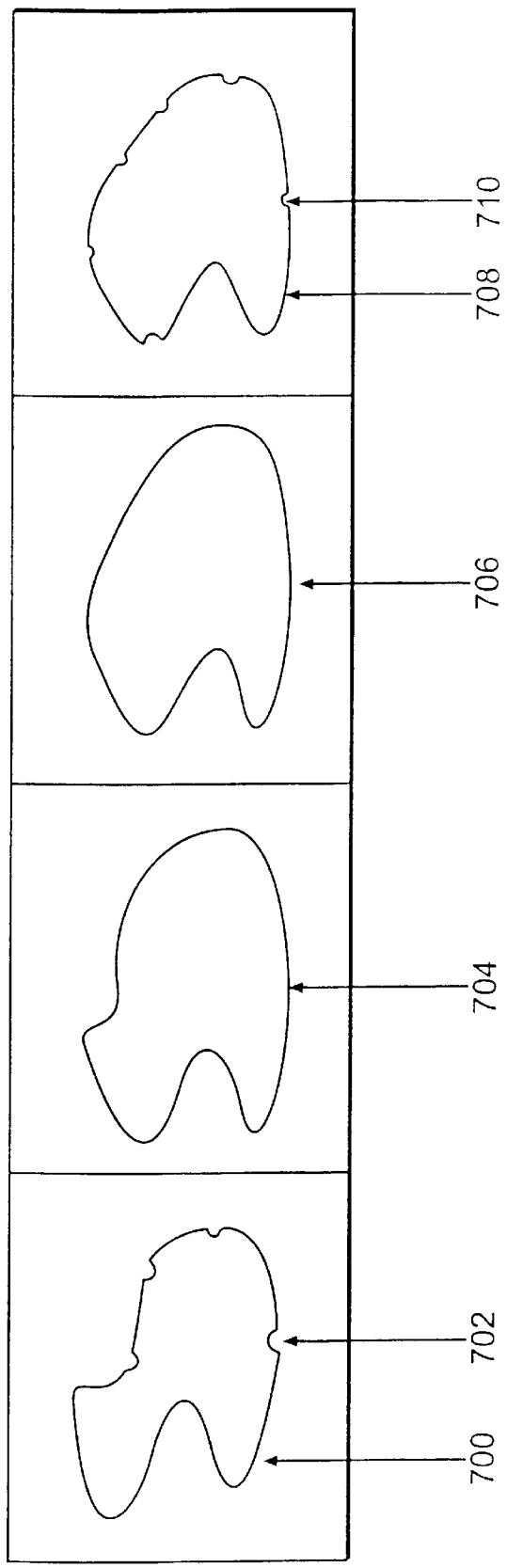
FIG. 7 is sequence of images illustrating registration of a template and target image.

In FIG. 7, four images, template image 700, image 704, image 706, and target image 708, illustrate the sequence of registering a template image and a target image. Template image 700 has 0-dimensional landmark manifolds 702. Applying the landmark manifold transform computed at step 350 in FIG. 3 to image 700 produces image 704. Applying a second transform computed using the synthesis equation combining landmark manifolds and image data to image 700 produces image 706. Image 706 is the final result of registering template image 700 with target image 708. Landmark manifold 710 in image 708 corresponds to landmark manifold 702 in template image 700.

While the disclosed system and method is useful for medical imaging systems used for noninvasive exploration of human anatomy, for example, computed tomography (CT) and magnetic resonance imaging (MRI), this invention can also be used on images acquired from other imaging modalities. Furthermore, application of the present invention is not limited to anatomical images. This invention also applies to non-anatomical images, including, but not limited to, satellite imagery, photographs, radar images, and images acquired from multiple sources.

The present invention overcame the limitation of the conventional technique by using some aspects of both techniques. Specifically, the principal advantage of the present invention is an image registration method and apparatus that fuses the techniques of registration using selected landmarks and image data. Other advantages of the invention include: 1) allowing for experts to insert knowledge directly into the imagery while at the same time allowing for the imagery itself to drive registration; 2) extending the classical framework for landmark point information (0-dimensional landmarks) used in manual assisted deformation to arbitrary manifold information in the form of 0, 1, 2, and 3 dimensional landmarks, i.e., correspondence between points (0-D) as well as lines (1-D), surfaces (2-D), and volume (3-D) dimensional anatomical coordinates; 3) a rapid convergence technique for registration using the fusion framework; and 4) an efficient FFT based convolutional implementation of the rapidly converging technique for fusion of the landmark and image information.

It will be apparent to those skilled in the art that various modifications and variations can be made to the disclosed embodiments of the present invention without departing from the spirit or scope of the invention. Thus it is intended that the present invention cover the modifications and variations of this invention provided they come within the scope of the appended claims and their equivalents.

We claim:

1. A method for registering images comprising the steps of:

selecting a first image with one or more landmarks;

selecting a second image containing image data elements, wherein one or more of said image data elements correspond to said one or more landmarks in said first image; and registering said first image and said second image using a registration function that incorporates said one or more landmarks in said first image and said one or more corresponding image data elements in said second image.

2. The method of claim 1, wherein said step of registering said first image and said second image using a registration function includes the substep of:

computing a registration function that fuses a first transform that uses said one or more landmarks in said first image with a distance measure relating said one or more landmarks in said first image and said one or more corresponding image data elements in said second image.

3. A method for registering images comprising the steps of:

selecting a first image with one or more landmarks, wherein said first image is a template image;

selecting a second image containing image data elements, wherein one or more of said image data elements correspond to said one or more landmarks in said first image and wherein said second image is a target image; and registering said first image and said second image using a registration function that incorporates said one or more landmarks in said first image and said one or more corresponding image data elements in said second image, wherein the registering includes the substep of computing a registration function using a transform of the form:

$$\hat{u} = \underset{u}{\arg\min}\ \gamma D_1(T(x - u(x)), S(x)) + \lambda \sum_{i=1}^{N} D_2(y_i, x_i - u(x_i)) + p(u)$$

where $D_1$ is a first distance measure between a transformed template image and said target image, $D_2$ is a second distance measure between said one or more landmarks in said target image and said one or more corresponding image data elements in said transformed template image, p(u) is a regularization energy, which can be zero, N is the number of landmarks, $x_i$ is the i-th landmark in said target image, $y_i$ is a landmark in said template image corresponding to $x_i$, x represents an image data element position in said target image, T(x) is the template image, S(x) is the target image, $\gamma$ is a first scale factor, and $\lambda$ is a second scale factor.

4. The method of claim 1, wherein said first image is a template image and said second image is a target image, and wherein said step of registering said first image and said second image using a registration function includes the substep of:

computing a registration function having at least a first distance term for comparing a target image data element value to a transformed template image element value and a second distance term for comparing said template image and said target image at said one or more landmarks.

5. An apparatus for registering images comprising:

means for selecting a first image with one or more landmarks;

means for selecting a second image containing image data elements, wherein one or more of said image data elements correspond to said one or more landmarks in said first image; and means for registering said first image and said second image using a registration function that incorporates said one or more landmarks in said first image and said one or more corresponding image data elements in said second image.

6. The apparatus of claim 5, wherein said means for registering said first image and said second image using a registration function includes:

means for computing a registration function that fuses a first transform that uses said one or more landmarks in said first image with a distance measure relating said one or more landmarks in said first image and said one or more corresponding image data elements in said second image.

7. The apparatus of claim 5, wherein said first image is a template image and said second image is a target image, and wherein said means for registering said first image and said second image using a registration function includes:

means for computing a registration function using a transform of the form:

$$\hat{u} = \underset{u}{\arg\min}\ \gamma D_1(T(x - u(x)), S(x)) + \lambda \sum_{i=1}^{N} D_2(y_i, x_i - u(x_i)) + p(u)$$

where $D_1$ is a first distance measure between a transformed template image and said target image, $D_2$ is a second distance measure between said one or more landmarks in said target image and said one or more corresponding image data elements in said transformed template image, p(u) is a regularization energy, which can be zero, N is the number of landmarks, $x_i$ is the i-th landmark in said target image, $y_i$ is a landmark in said template image corresponding to $x_i$, x represents an image data element position in said target image, T(x) is the template image, S(x) is the target image, $\gamma$ is a first scale factor, and $\lambda$ is a second scale factor.

8. The apparatus of claim 5, wherein said first image is a template image and said second image is a target image, and wherein said means for registering said first image and said second image using a registration function includes:

means for computing a registration function having at least a first distance term for comparing a target image data element value to a transformed template image element value and a second distance term for comparing said template image and said target image at said one or more landmarks.

9. An article of manufacture for registering images comprising:

a landmark module configured to cause a computer to select a first image with one or more landmarks;

an image module configured to cause the computer to select a second image containing image data elements, wherein one or more of said image data elements correspond to said one or more landmarks in said first image; and a registration module configured to cause the computer to register said first image and said second image using a registration function that incorporates said one or more landmarks in said first image and said one or more corresponding image data elements in said second image.

10. The article of manufacture of claim 9, wherein said registration module causes the computer to register said first image and said second image using a fusion module configured to cause the computer to compute a registration function that fuses a first transform that uses said one or more landmarks in said first image with a distance measure relating said one or more landmarks in said first image and said one or more corresponding image data elements in said second image.

11. An article of manufacture for registering images comprising:

a landmark module configured to cause a computer to select a first image with one or more landmarks wherein said first image is a template image;

an image module configured to cause the computer to select a second image containing image data elements, wherein one or more of said image data elements correspond to said one or more landmarks in said first image wherein said second image is a target image; and a registration module configured to cause the computer to register said first image and said second image using a registration function that incorporates said one or more landmarks in said first image and said one or more corresponding image data elements in said second image and wherein said registration module includes:

a transform module configured to cause a computer to compute a registration function using a transform of the form:

$$\hat{u} = \underset{u}{argmin}\, \gamma D_1(T(x-u(x)), S(x)) + \lambda \sum_{i=1}^{N} D_2(y_i, x_i - u(x_i)) + p(u)$$

where $D_1$ is a first distance measure between a transformed template image and said target image, $D_2$ is a second distance measure between said one or more landmarks in said target image and said one or more corresponding image data elements in said transformed template image, p(u) is a regularization energy, which can be zero, N is the number of landmarks, $x_i$ is the i-th landmark in said target image, $y_i$ is a landmark in said template image corresponding to $x_i$, x represents an image data element position in said target image, T(x) is the template image, S(x) is the target image, γ is a first scale factor, and λ is a second scale factor.

12. The article of manufacture of claim 9, wherein said first image is a template image and said second image is a target image, and wherein said registration module includes:
a transform module configured to cause the computer to compute a registration function having at least a first distance term for comparing a target image data element value to a transformed template image element value and a second distance term for comparing said template image and said target image at said one or more landmarks.

13. An apparatus for registering images comprising:
a landmark image selector for selecting a first image with one or more landmarks;
an intensity image selector for selecting a second image containing image data elements, wherein one or more of said image data elements correspond to said one or more landmarks in said first image; and
a registration processor for registering said first image and said second image using a registration function that incorporates said one or more landmarks in said first image and said one or more corresponding image data elements in said second image.

14. An apparatus for registering images comprising:
a selector for selecting a reference image;
a selector for selecting an intensity image, wherein one or more image elements contained in said intensity image correspond to one or more image elements in said reference image; and
a registration processor for registering said first image and said second image using a registration function that incorporates said one or more image elements contained in said intensity image and said one or more image elements in said reference image.

15. A method for registering images comprising the steps of:
selecting a reference image;
selecting an intensity image, wherein one or more image elements contained in said intensity image correspond to one or more image elements in said reference image; and
registering said first image and said second image using a registration function that incorporates said one or more image elements contained in said intensity image and said one or more image elements in said reference image.

* * * * *